UNITED STATES PATENT OFFICE.

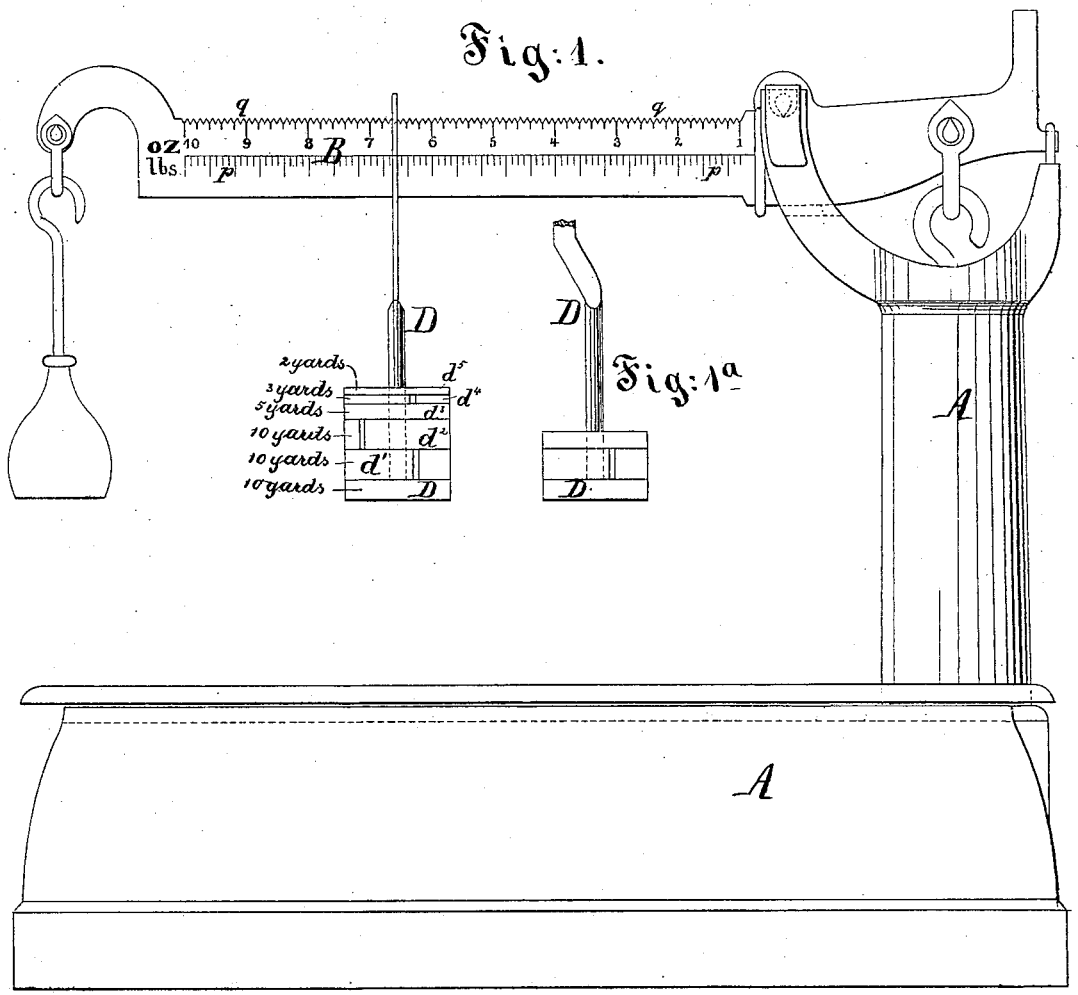

FRANKLIN FAIRBANKS AND LUKE G. SPENCER, OF ST. JOHNSBURY, VT., ASSIGNORS TO E. & T. FAIRBANKS & CO., OF SAME PLACE.

IMPROVEMENT IN PLATFORM-SCALES.

Specification forming part of Letters Patent No. 195,112, dated September 11, 1877; application filed March 10, 1877.

*To all whom it may concern:*

Be it known that we, FRANKLIN FAIRBANKS and LUKE G. SPENCER, of St. Johnsbury, Caledonia county, in the State of Vermont, have invented certain new and useful Improvements relating to Weighing-Scales, of which the following is a specification:

Our invention is intended to facilitate the determination of the weight of cloth. In the manufacture of such fabrics continual watchfulness is required to keep the material of a uniform thickness and weight. It is desirable to weigh each roll as it is taken from the loom, and, dividing the gross weight by the number of yards therein, to determine in which direction and how much the weight per yard varies from the standard. The mathematical operation of dividing involves labor, which becomes irksome after a long period.

Our invention saves trouble by showing the weight per yard by inspection, and allows the work to be done by laborers having no mathematical skill. We graduate the beam with two lines of figures, one showing the weight of the mass in pounds, as usual, the other showing, under proper conditions, the weight of the cloth per yard. These graduations are so proportioned that the same poise will serve for each—that is to say, the same poise which indicates pounds on the ordinary graduation will indicate ounces and fractions of an ounce on the other line of graduation when the roll of cloth contains the ordinary quantity, forty yards.

There are many kinds of goods in which the pieces contain more or less than forty yards. In such cases we determine the weight per yard in the same manner, by simple inspection, by changing the weight of the poise.

We produce our poise with removable pieces properly marked, by adding and removing which at will we may, with little labor or loss of time, make ready for weighing pieces having sixteen yards, twenty-four yards, or any other ordinary quantity in a piece.

The accompanying drawings form a part of this specification, and represent what we consider the best means of carrying out the invention.

Figure 1 is a side elevation of the entire scale in condition for use, weighing rolls of forty yards. Fig. 1ª is a view of the poise reduced by the removal of some of the parts. It is made up for weighing pieces of cloth containing only twenty-five yards. In this condition the lower line of graduations cannot be made available. If it is desired to know the aggregate weight of the entire roll, when the roll is less than the ordinary forty yards, the poise must be temporarily made up for forty yards, and then the total weight will be correctly indicated on the lower line of graduations.

It will be understood that in Fig. 1ª the poise is turned quarter around.

Similar letters of reference indicate corresponding parts in both the figures.

The general construction may be that of an ordinary platform-scale.

A is a portion of the fixed frame-work. B is the beam, and $p\ q$ the two lines of graduations. The graduations $p$ are of the ordinary character, and indicate the total weight of the article on the platform when the poise is in a certain condition, as, for example, when it is adapted for weighing pieces of forty yards. In other conditions the advantage of determining the gross weight by inspection at the same time that the weight per yard is determined cannot, of course, be enjoyed.

The line or series of graduations $q$ is that which is mainly important as determining the main fact desired—the weight of the goods per yard.

The poise is composed of a skeleton, D, with a number of separately-removable attachments, $d^1\ d^2$, &c., each plainly marked with figures and letters, or distinguished by the material or the coloring, or by all these means, so as to reduce the chances of error.

When all the attachments are applied the place on the graduations $q$ where the poise balances the load indicates the weight per yard, forty yards in a piece. When a less number of attachments are applied, the place on the graduations $q$ where the poise balances the weight indicates the weight per yard for twenty-four or some other less number of yards in the piece.

It usually happens that the weighing device may be adjusted for weighing one kind of cloth, or rather one length of pieces thereof, and will be continued in use for that kind of goods, or for goods put up in such rolls, for a considerable period; but in case it shall be required to change the condition at short intervals, it can be done with almost no loss of time by simply adding or removing one or more of the attachments $d^1$ $d^2$, &c. It may be preferable in most cases to make the standard length forty yards; but we believe other lengths may thus be adopted. This may be optional, but it must be distinctly understood by the operator.

The several parts $d^1$ $d^2$, &c., of the poise should be marked with the number of yards per piece which they respectively represent, and not simply with their weight. The skeleton D should also be marked with number of yards it alone represents.

We claim as our invention—

1. The cloth-weighing scale described, having a beam carrying the graduations $q$, adapted to indicate the ounces per yard, in combination with the poise D having removable parts $d^1$ $d^2$, which allow the device to readily apply to different lengths of cloth, as herein specified.

2. The sectional poise D $d^1$ $d^2$ $d^3$, distinctively marked, as shown, in combination with a platform-scale and with the scale-beam B, having both a series of graduations, $p$, indicating the total weight of the load, and another series of graduations, $q$, indicating the weight per yard of the goods, as herein specified.

In testimony whereof we have hereunto set our hands this 6th day of March, 1877, in the presence of two subscribing witnesses.

FRANKLIN FAIRBANKS.
LUKE G. SPENCER.

Witnesses:
E. D. BLODGETT,
PERLEY F. HAZEN.